United States Patent [19]

Kanniainen et al.

[11] Patent Number: 5,055,275
[45] Date of Patent: Oct. 8, 1991

[54] REINFORCED CATALYTIC UNIT INTENDED FOR PURIFYING EXHAUST GASES

[75] Inventors: Kauko Kanniainen; Veikko Loukeinen, both of Vihtavuori, Finland

[73] Assignee: Kemira Oy, Helsinski, Finland

[21] Appl. No.: 159,548

[22] Filed: Feb. 22, 1988

Related U.S. Application Data

[62] Division of Ser. No. 42,310, Apr. 24, 1987, Pat. No. 4,741,082.

[30] Foreign Application Priority Data

Apr. 29, 1986 [FI] Finland .................................. 861801

[51] Int. Cl.⁵ .............................................. B01D 53/36
[52] U.S. Cl. ........................... 422/180; 422/177; 422/180; 422/181; 422/171; 55/DIG. 30; 55/385.3
[58] Field of Search ............... 422/177, 180, 181, 179; 55/DIG. 30, 385.3; 502/527, 439

[56] References Cited

U.S. PATENT DOCUMENTS

| 4,004,887 | 1/1977 | Stormont | 422/179 |
|---|---|---|---|
| 4,115,071 | 9/1978 | Masuda et al. | 422/179 |
| 4,186,172 | 1/1980 | Scholz | 422/180 |
| 4,220,625 | 9/1980 | Toh et al. | 422/177 |
| 4,381,590 | 5/1983 | Nonnenmann et al. | 29/157 X |
| 4,521,947 | 6/1985 | Nonnenmann et al. | 29/157 R |
| 4,567,630 | 2/1986 | Ishida et al. | 422/180 |
| 4,598,063 | 7/1986 | Retallick | 502/439 |
| 4,637,568 | 1/1987 | Cornelison | 422/180 |
| 4,795,616 | 1/1989 | Mondt et al. | 422/180 |

FOREIGN PATENT DOCUMENTS 2069364A  8/1981  United Kingdom .

*Primary Examiner*—David L. Lacey
*Assistant Examiner*—Abanti B. Singla
*Attorney, Agent, or Firm*—Thomas R. Vigil

[57] ABSTRACT

The invention relates to a reinforced catalytic unit intended for purifying exhaust gases. The unit is a reinforced helical catalytic unit formed from a corrugated foil band and a straight foil band. The foil bands are coated in advance with both a layer of support material and a layer of catalyst material and are placed one on top of the other. They are then secured to a central shaft around which the catalytic unit is formed by winding of the bands helically around the central shaft. Thereafter, end supports are secured to the ends of the shaft in such a way that they press somewhat to the inside of the unit and prevent movement of the foil bands in relation to each other.

6 Claims, 2 Drawing Sheets

REINFORCED CATALYTIC UNIT INTENDED FOR PURIFYING EXHAUST GASES

This is a division of application Ser. No. 42,310, filed Apr. 24, 1987, now U.S. Pat. No. 4,741,082.

BACKGROUND OF THE INVENTION

Field of the Invention

The present invention relates to a method for manufacturing and reinforcing a catalytic unit intended for the purification of exhaust gases, by forming a helical unit by winding from a corrugated foil band and a straight foil band disposed one on top of the other.

A catalytic unit and a method for making the unit of the type described above is known previously from, for example, GB patent 2069364. According to this method, the unit is first made from uncoated foil bands, and at both or one of the ends of the unit there are welded one or several seams the purpose of which is to prevent axial movement of the helical foil bands in relation to one another. In this method the catalytic unit cannot be coated with a support material and a catalytic material until after the welding, since the support material lowers the electric conductivity and prevents the flow of current during welding. When the support material is added to a complete unit, it does not spread evenly but accumulates in the cavities formed by the meeting points of the foils and collects in itself the actual catalyst, in which case the catalyst material will not be used effectively, a factor which for its part increases the costs and lowers the efficiency. The seams produced do not necessarily withstand the stresses the unit is subjected to during use.

DE Patent 2924592 discloses a method for making a catalytic unit, in which method an uncoated corrugated foil band and an uncoated straight foil band are secured together by brazing. This method has a disadvantage in that in connection with the brazing it is necessary to use high temperatures, which results in the weakening of the structure and a deterioration of the surface.

In this method, also, the catalytic unit cannot be coated until after the foils have been secured together. In addition, the brazing is difficult to carry out.

SUMMARY OF THE INVENTION

The object of the present invention is to provide a reinforced catalytic unit which does not have the disadvantages of previously known units. According to the invention, this is achieved by securing a corrugated foil and a straight foil, coated in advance with both a supporting material layer and a catalyst layer, to a central shaft, which is a thin rod and around which the catalytic unit of the desired size is formed, whereafter end supports having at maximum the length of the diameter of the unit are secured to the ends of the shaft in such a way that they press somewhat to inside the unit, thereby preventing axial movement of the foils in relation to each other.

According to the present invention, a catalytic unit is obtained which keeps its shape even when subjected to great stress. The system according to the invention prevents the movement and rubbing of the foils against each other, which could cause the catalyst layer to be rubbed off and, furthermore, the channels to be clogged as the unit is twisted.

Further according to the present invention there is provided a reinforced catalytic unit used for the purification of exhaust gases, the unit being a reinforced helical catalytic unit comprising a central shaft core element having opposite ends, a corrugated foil band and a straight foil band placed one on top of the other, the corrugated foil band and the straight foil band a support material layer and a catalyst layer wherein the support material layer and the catalyst layer are placed one on top of the other on each of the corrugated foil band and the straight foil band, and then secured to the core element of the central shaft, and the catalytic unit having rigid end supports secured to the ends of the shaft element wherein both of the ends of the central shaft element comprise end supports to prevent movement of the foil bands in relation to each other.

BRIEF DESCRIPTION OF THE DRAWINGS

The invention is described below with reference to the accompanying figures, in which.

DESCRIPTION OF THE PREFERRED EMBODIMENT

Figure 1:
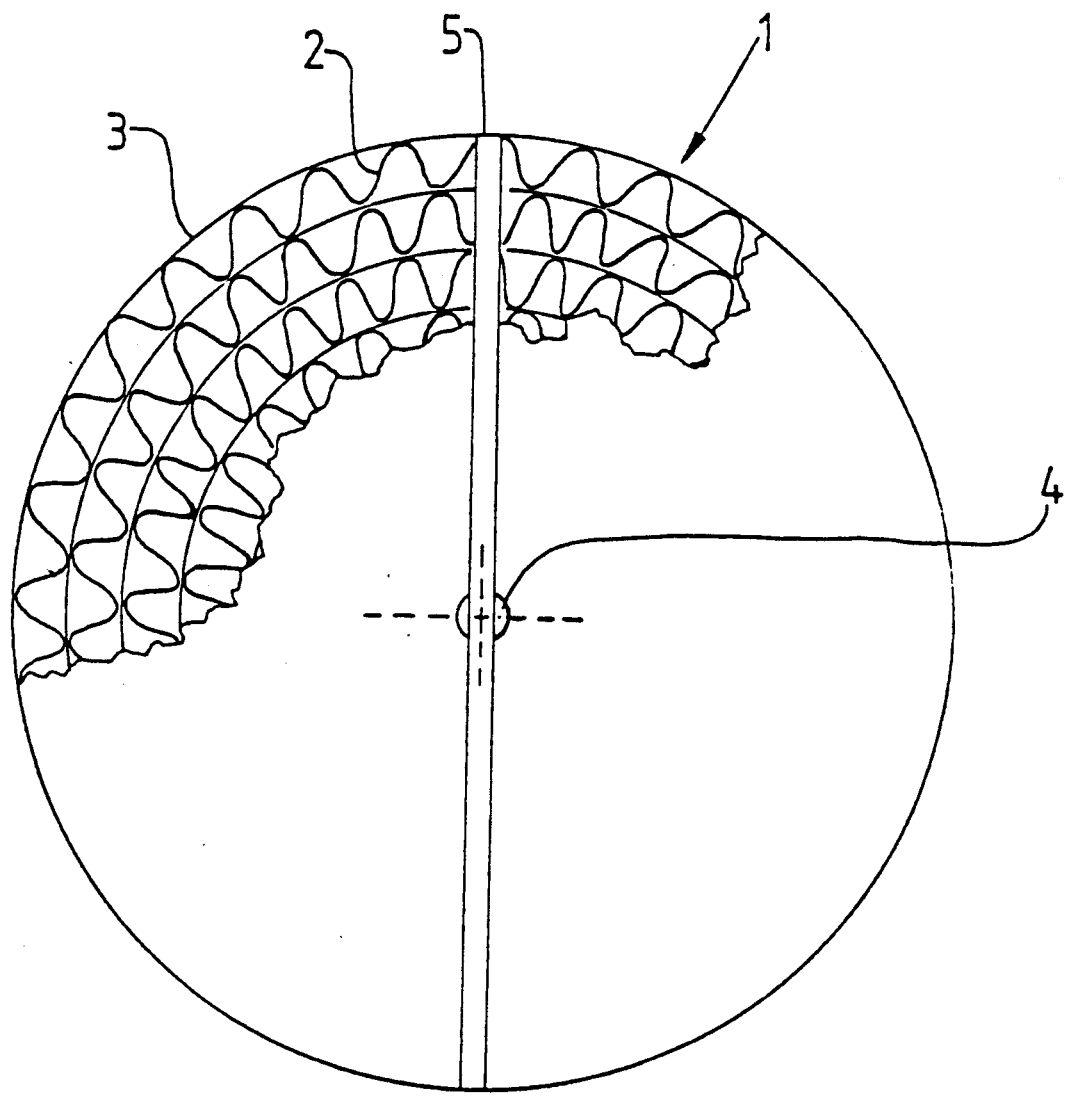
FIG. 1 depicts an end view of a catalytic unit according to the invention.

FIG. 1 shows a catalytic unit 1 wound from a corrugated foil band 2 and a straight foil band 3, placed one on top of the other, there being an end support 5, having the length of the diameter of the unit, fitted in a slit 6 at the end of the central shaft 4 of the unit.

Figure 2:
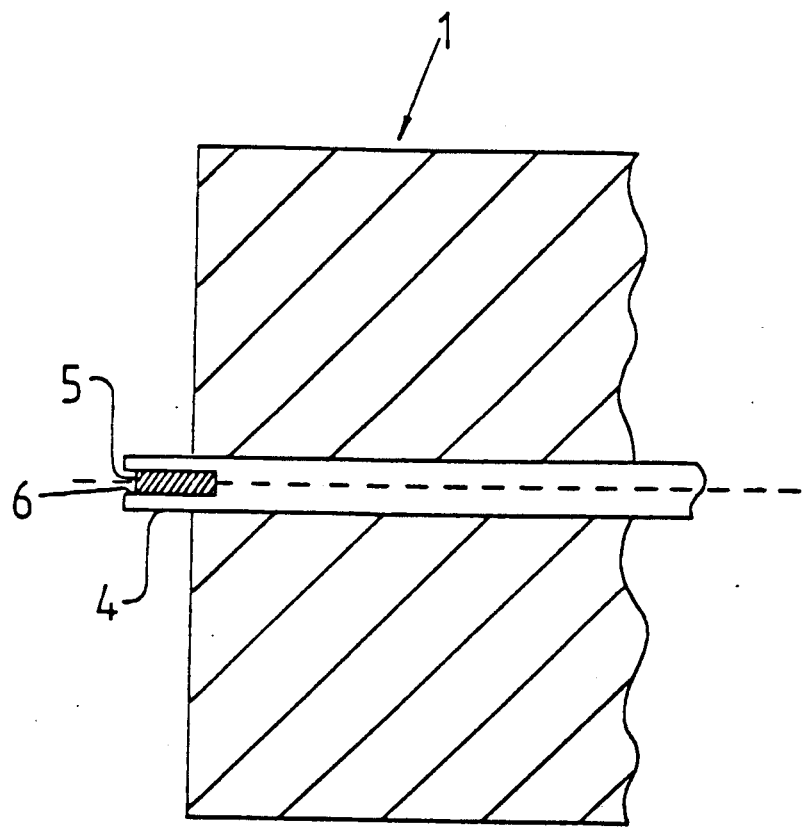
FIG. 2 depicts a side view of a preferred embodiment of the invention.

FIG. 2 shows a preferred embodiment of the invention, in which an end support 5 has been fitted into the slit 6 in the central shaft 4 of the catalytic unit 1 in such a way that it presses somewhat to inside the unit.

Before forming the helical catalytic unit 1, both the corrugated foil band 2 and the straight foil band 3 are coated according to the invention first with the support material and then with the catalyst material. Thereafter the foil bands 2 and 3, placed one on top of the other, are secured to the central shaft 4, which serves as the rotation shaft at the manufacturing stage of the catalytic unit 1. The central shaft 4 is a thin rod, preferably with slits 6 at both ends, which helps the securing of the shaft 4 to the rotating device. The slits 6 at the ends of the shaft 4 may be parallel or may run in different directions, for example, be perpendicular to each other.

When the unit 1 is of the desired size, the foil bands 2 and 3 are cut and their ends are secured to the unit 1. The unit 1 is detached from the rotating device, the shaft 4 remaining as a support shaft 4 inside the catalytic unit 1, and transverse end supports 5 are secured to the ends of the shaft 4. The end supports 5 should preferably have the length of the diameter of the catalytic unit 1 so that the catalytic unit 1 becomes a rigid piece which retains its shape.

The end supports 5 are pressed into the slits 6 preferably located at the ends of the shaft 4, in such a way that the supports press about 1-3 mm to inside the unit 1, preventing the movement of the foil bands 2 and 3 in relation to each other. Thereafter, the end supports 5 are secured firmly to the ends of the shaft 4, for example by welding. In this case only the ends of the shaft 4 are exposed to the heat caused by the welding, and so the heat will not damage the catalytic unit 1.

In one preferred embodiment, the end support can be made up of two supports placed crosswise and fitted into the slit 6 of a suitable shape formed at the end of the shaft.

Further, the end support 5 can be secured to the central shaft 4 also in some manner other than that described above, for example by drilling through the center of gravity of the end support 5 a hole into which the end of the central shaft 4 is fitted and secured. Except by welding, the end support 5 can also be secured by, for example fitting a cotter pin into a hole drilled transversely through the end of the shaft 4 after the shaft 4 has been fitted into the hole formed in the end support 5.

The central shaft 4 and the end supports 5 are preferably made of fire-resistant steel.

We claim:

1. A reinforced catalytic unit used for the purification of exhaust gases, said unit being a reinforced helical catalytic unit comprising a central shaft core element having opposite ends, a corrugated foil band and a straight foil band placed one on top of the other, said corrugated foil band and straight foil band both comprising a support material layer and a catalytst layer wherein the support material layer and the catalyst layer are arranged to be one on top of the other on each of said corrugated foil band and said straight foil band, and are secured to the central shaft element, and said catalytic unit having rigid end support means at each of said opposite ends, said end support means being inserted inwardly into one of said ends of said shaft element and secured to the ends of the shaft element so that said end support means prevent movement of the foil bands in relation to each other.

2. The reinforced catalytic unit of claim 1 wherein both ends of the central shaft element have slits into which the end support means are pressed and secured.

3. The reinforced catalytic unit of claim 2 wherein said slits are parallel.

4. The reinforced catalytic unit of claim 2 wherein said slits are generally perpendicular to each other.

5. The reinforced catalytic unit of claim 1 wherein at least one of said end support means is made up of at least two crossing support members received in a specially formed slit in one end of the shaft element and fixed to the shaft.

6. The reinforced catalytic unit of claim 1 wherein said end support means are fixed respectively to the ends of the unit by being welded respectively to the ends of the shaft element only.

* * * * *